United States Patent [19]

Wendling

[11] Patent Number: 4,532,319

[45] Date of Patent: Jul. 30, 1985

[54] SOLID STATE POLYMERIZATION OF POLYESTER

[75] Inventor: Paul R. Wendling, Akron, Ohio

[73] Assignee: The Goodyear Tire & Rubber Company, Akron, Ohio

[21] Appl. No.: 649,882

[22] Filed: Sep. 13, 1984

[51] Int. Cl.³ .............................................. C08G 63/26
[52] U.S. Cl. ..................................... 528/274; 528/483
[58] Field of Search ................................ 528/274, 483

[56] References Cited

U.S. PATENT DOCUMENTS

| | | | |
|---|---|---|---|
| 3,585,259 | 6/1971 | Lefferts et al. | 528/483 X |
| 3,586,647 | 6/1971 | Kremer | 528/483 X |
| 3,634,356 | 1/1972 | Tryon | 528/483 X |
| 3,718,621 | 2/1973 | Wilson | 528/483 X |
| 4,374,975 | 2/1983 | Duh | 528/272 |
| 4,379,912 | 4/1983 | Lu | 528/274 |

*Primary Examiner*—Lucille M. Phynes
*Attorney, Agent, or Firm*—Alvin T. Rockhill

[57] ABSTRACT

Polyesters are often polymerized to higher molecular weights in the solid state in the presence of an inert gas stream. The inert gas stream removes volatile reaction products and helps to heat the polyester. It has been found that the amount of inert gas needed to solid state polymerize a polyester can be greatly reduced by pulsing the inert gas through the polyester.

20 Claims, No Drawings

SOLID STATE POLYMERIZATION OF POLYESTER

BACKGROUND OF THE INVENTION

High molecular weight polyesters are commonly produced from low molecular weight polyesters of the same composition by solid state polymerization. The low molecular weight polyesters which are used in such solid state polymerizations are prepared by conventional melt polymerizations. Solid state polymerization is generally considered advantageous in that the handling of high molecular weight ultra-high viscosity molten polymers during the polymerization phase is eliminated. Thermal degradation during the solid state portion of the polymerization is also essentially avoided.

In melt polymerizations, the major part of the reaction is transesterification due to the fact that thermal pyrolysis nullifies much of the esterification of carboxyl end groups. A much larger percentage of the reaction in a solid state polymerization is esterification. Thus, a higher molecular weight can be obtained in a solid state polymerization with a lower carboxyl concentration than can be achieved in a melt polymerization.

In the solid state polymerization of a polyester the polymerization is carried out at an elevated temperature which is below the melting point of the polyester resin. This polymerization is normally conducted in the presence of a stream of inert gas. The inert gas stream serves to remove volatile reaction products and helps to heat the polyester.

SUMMARY OF THE INVENTION

The amount of inert gas needed to solid state polymerize a polyester can be greatly reduced by pulsing the inert gas through the polyester. This process of pulsing an inert gas through a polyester which is being solid state polymerized can be done without affecting the physical properties of the high molecular weight polyester resin being produced or the time needed to solid state polymerize it to a given molecular weight.

This invention more specifically discloses an improved process for solid state polymerizing a polyester prepolymer to a high molecular weight polyester resin comprising heating the polyester prepolymer to a temperature of from about 1° C. to about 50° C. below its sticking temperature in the presence of a pulsing stream of an inert gas. This invention also reveals that in the process for solid state polymerizing a polyester prepolymer to a high molecular weight polyester resin in the presence of a stream of inert gas at an elevated temperature, the improvement which comprises pulsing the inert gas through the polyester prepolymer.

DETAILED DESCRIPTION OF THE INVENTION

This invention is applicable to virtually any polyester which can be solid state polymerized. The most common type of polyesters which will be solid state polymerized using the technique of this invention will have at least about 75 mole percent of their acid moieties being provided by terephthalic acid and/or a naphthalene dicarboxylic acid (preferably 2,6-) with their diol moieties being provided by glycols, such as ethylene glycol, butylene glycol, 1,4-dimethylol cyclohexane, and the like, or aromatic diols, such as hydroquinone and catechol. The polyesters can also contain other dicarboxylic acids, such as adipic acid, isophthalic acid, sebacic acid, and the like. Polyethylene terephthalate (PET) and polybutylene terephthalate homopolymers are examples of polyesters that are often solid state polymerized to high molecular weights. Blends of various polyesters can also be polymerized utilizing the process of this invention.

The starting polyesters utilized in this invention are typically prepared by melt polymerization techniques. These polyester prepolymers generally have an initial starting I.V. (intrinsic viscosity) of at least 0.3 dl/g in a 60:40 phenol:tetrachloroethane solvent system at a temperature of 30° C. and at a concentration of 0.4 g/dl. Preferably the polyester prepolymers which are solid state polymerized in accordance with this invention will have an original or starting I.V. of from about 0.4 to about 0.7 dl/g.

Polyester prepolymers are generally converted from the amorphous to the crystalline state prior to solid state polymerization in order to raise their sticking temperature. This is done in order to keep the polyester prepolymer from sticking together as a solid mass in the solid state polymerization reactor. Preferably the polyester prepolymer being solid state polymerized will be at least 20% crystalline. This crystallization can be accomplished by any suitable treatment such as slowly cooling an extruded or cast polymer melt to room temperature, or a quenched polymer melt in the amorphous state may be crystallized by a controlled heating treatment or by treating the solid polymer with the vapor of a suitable organic solvent.

The sticking temperature of crystalline or partially crystalline polyethylene terephthalate prepolymers is about 230° C. which is much higher than their sticking temperature in the amorphous state which is about 100° C. to 150° C. Typically a polyester prepolymer can be converted to about 20% to 40% crystallinity by heating at 150° C. for 5 to 300 minutes. At lower crystallization temperatures, longer heating times are generally desirable. Suitable time relationships can be determined easily by observing the change in appearance of the particular polyester as it changes from translucent to opaque as an indication of substantial crystal formation in the polyester. Although the low I.V. polyester may be in the form of thin film filaments or ribbons, it is usually preferable to sub-divide the material as by flaking or chopping a film or sheet into thin pieces or by chopping or cutting films, ribbons or rods. The polyester prepolymer utilized in the solid state polymerization of this invention will generally be in the form of pellets or chips. Such pellets can vary greatly in size, however, as a general rule, the smaller the size of the pellets of polyester prepolymer the faster the solid state polymerization will proceed.

Polyester prepolymers can be solid state polymerized in accordance with the process of this invention in a batch or a continuous process. Suitable solid state polymerization temperatures can range from a temperature just above the threshold temperature of the polymerization reaction up to a temperature within a few degrees of the sticking temperature of the resin which can be well below its melting point. This temperature is usually from about 1° C. to about 50° C. below the sticking temperature of the polyester prepolymer. The optimum solid state reaction temperature will differ somewhat for polymers or copolymers of different compositions and of different molecular weight. As a general rule, the optimum solid state polymerization temperature for a
} polyester prepolymer will be from about 5° C. to about 20° C. below its sticking temperature. For example, in the solid state polymerization of crystalline polyethylene terephthalate, the highest temperatures which can normally be employed range from 240° C. to 245° C., which is just below the sticking temperature of this polyester and about 20° C. belows its melting point. Generally, polyethylene terephthalate will be solid state polymerized at a temperature of from about 210° C. to about 245° C. In most cases polyethylene terephthalate will be solid state polymerized at a temperature of from 220° C. to 240° C.

As the solid state polymerization of a polyester prepolymer proceeds its sticking temperature can increase. Thus, the solid state polymerization temperature can be incrementally increased during the course of the polymerization. For example, in the case of polyethylene terephthalate the process described in U.S. Pat. No. 3,718,621, which is incorporated herein by reference in its entirety, can be utilized.

An inert gas is pulsed through the polyester prepolymer as it is being solid state polymerized at the elevated temperature used for the polymerization. In other words, a pulsing stream of an inert gas passes through the polymerization zone or polymerization reactor where the polyester prepolymer is being solid state polymerized. It is highly desirable for the inert gas to flow uniformly throughout the solid state polymerization zone which is filled with the polyester prepolymer which is being polymerized. In order to help insure that the inert gas flows homogeneously or uniformly through the solid state polymerization zone without bypassing certain areas in it a device for dispersing the inert gas is generally used. Thus, a good polymerization reactor will be designed in such a way that the inert gas will flow homogeneously through the polyester prepolymer in it. It should be noted that the inert gas actually flows around the pellets or chips of polyester prepolymer as it streams through the solid state polymerization zone.

Some suitable inert gases for use in the solid state polymerization process of this invention include nitrogen, carbon dioxide, helium, argon, neon, krypton, xenon, and certain industrial waste gases. Various combinations or mixtures of different inert gases can also be used. In most cases nitrogen will be used as the inert gas.

The inert gas is pulsed through the polyester prepolymer by rhythmically varying its flow rate. Thus, the flow rate of the inert gas which passes through the polyester prepolymer does not remain constant. It can be varied from fast to slow to fast to slow or more practically can be varied from flowing to not flowing to flowing to not flowing. The easiest way to pulse the inert gas through the polyester prepolymer is to rhythmically turn its flow on and off.

The total amount of inert gas needed to solid state polymerize a polyester prepolymer into a high molecular weight polyester resin in a given solid state polymerization reaction at a given temperature can be greatly reduced by pulsing the inert gas through the polyester prepolymer. This can not be accomplished by simply reducing the flow rate of the inert gas through the polyester prepolymer. If the flow rate is simply reduced below a minimum value for a particular polyester being polymerized at a particular temperature then the rate of polymerization will be reduced. However, the inert gas can be pulsed through the polyester prepolymer by turning its flow rhythmically on and off at this minimum flow rate without the rate of polymerization being reduced.

The minimum amount of inert gas that needs to be pulsed through a given polyester prepolymer per unit time per unit weight will vary with the polyester, the solid state polymerization temperature used, and the design of the polymerization reactor. The optimum manner of pulsing the inert gas through the polyester will also vary with the type of polyester used, the polymerization temperature used, and the design and size of the polymerization reactor. Usually, between about 0.05 and about 2 liters of inert gas per hour will be pulsed through the polyester prepolymer per kilogram of the polyester prepolymer.

The best way to pulse the inert gas through the polyester prepolymer being solid state polymerized is to repeatedly turn its flow on and off. However, it is not necessary to ever completely stop the flow of the inert gas. The inert gas can be allowed to flow at a slow rate at all times. It is important for the flow rate of the inert gas to vary from fast to slow (or no flow at all) in a cyclic manner. In most cases where the inert gas is pulsed by turning its flow on and off in a cyclic manner each cycle will be between 1 second and 10 minutes in duration. The duration of a cycle is the time interval from when the inert gas is turned on in one cycle until when it is turned on again in the next cycle after being turned off. In most cases the flow of inert gas will be on for at least 10% of the duration of each on-off cycle. Preferably the flow of inert gas will be on between about 25% and about 75% of the time in each cycle. More preferably the flow of inert gas will be on from 40% to 60% of the duration of each cycle. The cycles will preferably have a duration of from about 5 seconds to about 5 minutes. Most preferably these on-off cycles will have a duration of from about 20 seconds to about 2 minutes.

The polyester prepolymer will be solid state polymerized for a time sufficient to increase its molecular weight or I.V. to that of the high molecular weight polyester resin desired. Normally it will be desirable for the high molecular weight polyester resin being prepared to have an I.V. of at least 0.65 dl/g. In most cases the high molecular weight resin will have an I.V. of at least 0.7 dl/g and for many applications will preferably have an I.V. of at least 0.8 dl/g. The polymerization time needed will normally range from about 1 to about 36 hours and in most cases will range from 6 to 24 hours.

This invention is illustrated by the following examples which are merely for the purpose of illustration and are not to be regarded as limiting the scope of the invention or manner in which it may be practiced. Unless specifically indicated otherwise all parts and percentages are given by weight.

EXAMPLE 1

A laboratory size solid state polymerization reactor equipped with a cindered glass dispersing plate was used in this experiment. About 90 g of a polyethylene terephthalate prepolymer having an I.V. of 0.59 dl/g was put into it and the reactor was placed in a water bath at 230° C. A preheated nitrogen stream was allowed to flow through the prepolymer in the reactor at a constant rate of 4 standard cubic feet per hour. The PET prepolymer was allowed to solid state polymerize for about 5 hours. The resin produced by this process was determined to have an I.V. of about 0.90 dl/g. This example was done as a control to show the final I.V. of a PET resin made in the laboratory reactor after 5 hours of polymerization time at a temperature of 230° C. It has been determined that if a constant flow rate of less than 4 standard cubic feet per hour is used that the I.V. of the polymer produced will be reduced. Thus, 4 standard cubic feet per hour is the minimum constant flow rate at which this laboratory size reactor can be run without reducing the I.V. of the resin produced.

EXAMPLE 2

This example was done in order to show that the amount of nitrogen used in Example 1 can be reduced by 50% without increasing polymerization times or decreasing the I.V. of the PET resin produced. This experiment was done using the procedure described in Example 1 except that the nitrogen was pulsed through the PET prepolymer by turning its flow on and off in a 60 second cycle. The nitrogen was allowed to flow at the same flow rate as was used in Example 1 when it was turned on and it was turned on for intervals of 30 seconds. Thus, the nitrogen was on for 30 seconds, off for 30 seconds, and so on.

It was determined that the PET resin made in this experiment had a final I.V. of 0.90 dl/g. Thus, even though the flow of nitrogen was off 50% of the time there was no reduction in the I.V. of the PET resin produced. This example shows that by using the process of this invention the total amount of nitrogen needed to make a resin by solid state polymerization having an I.V. of 0.90 dl/g can be reduced by 50% over the minimum amount of nitrogen needed to make the resin using a constant flow rate.

Variations in the present invention are possible in light of the description of it provided herein. It is, therefore, to be understood that changes can be made in the particular embodiments described which will be within the full intended scope of the invention as defined by the following appended claims.

What is claimed is:

1. In the process for solid state polymerizing a polyester prepolymer to a high molecular weight polyester resin in the presence of a stream of inert gas at an elevated temperature, the improvement which comprises pulsing the inert gas through the polyester prepolymer.

2. A process as specified in claim 1 wherein said inert gas is selected from the group consisting of nitrogen, carbon dioxide, helium, argon, neon, krypton and xenon.

3. A process as specified in claim 2 wherein said inert gas is pulsed through said polyester prepolymer by turning its flow on and off in a cyclic manner.

4. A process as specified in claim 3 wherein the duration of each cycle is between 1 second and 10 minutes.

5. A process as specified in claim 4 wherein said polyester prepolymer has an initial I.V. of at least 0.3 dl/g.

6. A process as specified in claim 5 wherein said elevated temperature is from about 1° C. to about 50° C. below the sticking temperature of said polyester prepolymer.

7. A process as specified in claim 6 wherein said inert gas flows for at least 10% of the duration of each on-off cycle.

8. A process as specified in claim 7 wherein said polyester prepolymer has an initial I.V. of from about 0.4 to about 0.7 dl/g.

9. A process as specified in claim 8 wherein the duration of each cycle is between about 5 seconds and about 5 minutes and wherein said inert gas flows for between about 25% and about 75% of the duration of each on-off cycle.

10. A process as specified in claim 9 wherein said inert gas is nitrogen and wherein said polyester prepolymer is polyethylene terephthalate.

11. A process as specified in claim 10 wherein the duration of each cycle is between about 20 seconds and about 2 minutes.

12. A process as specified in claim 11 wherein said inert gas flows for 40% to 60% of the duration of each on-off cycle.

13. A process as specified in claim 12 wherein said elevated temperature is from about 210° C. to about 245° C.

14. A process as specified in claim 12 wherein said elevated temperature is from 220° C. to 240° C.

15. A process as specified in claim 9 wherein said elevated temperature is from about 5° C. to about °° C. below the sticking temperature of said polyester prepolymer.

16. A process as specified in claim 15 wherein said inert gas is nitrogen.

17. A process as specified in claim 16 wherein said polyester prepolymer is polybutylene terephthalate.

18. An improved process for solid state polymerizing a polyester prepolymer to a high molecular weight resin comprising heating the polyester prepolymer to a temperature of from about 1° C. to about 50° C. below its sticking temperature in the presence of a pulsing stream of an inert gas.

19. An improved process as specified in claim 18 wherein said inert gas is pulsed through said polyester prepolymer by turning its flow on and off in a cyclic manner, wherein the duration of each cycle is between about 5 seconds and about 5 minutes, and wherein said inert gas flows for 25% to 75% of the duration of each on-off cycle.

20. An improved process as specified in claim 19 wherein said temperature is from about 5° C. to about 20° C. below the sticking temperature of said polyester prepolymer.

* * * * *